US012587704B2

US 12,587,704 B2

(12) United States Patent
Kim et al.

(10) Patent No.: US 12,587,704 B2
(45) Date of Patent: Mar. 24, 2026

(54) VIDEO DATA TRANSMISSION AND RECEPTION METHOD USING HIGH-SPEED INTERFACE, AND APPARATUS THEREFOR

(71) Applicant: LG ELECTRONICS INC., Seoul (KR)

(72) Inventors: Dokyun Kim, Seoul (KR); Kyeongryeol Park, Seoul (KR); Seunghyun Yoo, Seoul (KR); Yoonjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 548 days.

(21) Appl. No.: 17/925,201

(22) PCT Filed: May 14, 2021

(86) PCT No.: PCT/KR2021/006085
§ 371 (c)(1),
(2) Date: Nov. 14, 2022

(87) PCT Pub. No.: WO2021/230711
PCT Pub. Date: Nov. 18, 2021

(65) Prior Publication Data
US 2023/0199246 A1 Jun. 22, 2023

Related U.S. Application Data

(60) Provisional application No. 63/038,082, filed on Jun. 11, 2020.

(30) Foreign Application Priority Data

May 14, 2020 (KR) ........................ 10-2020-0057974

(51) Int. Cl.
*H04N 21/4363* (2011.01)
*G06T 5/92* (2024.01)
(Continued)

(52) U.S. Cl.
CPC ......... *H04N 21/43635* (2013.01); *G06T 5/92* (2024.01); *G06T 7/90* (2017.01);
(Continued)

(58) Field of Classification Search
CPC ......... H04N 21/43635; H04N 21/4402; H04N 21/4516; G06T 5/92; G06T 7/90; G06T 2207/20208; G06V 10/60; G09G 5/12
See application file for complete search history.

(56) References Cited

U.S. PATENT DOCUMENTS

| | | | |
|---|---|---|---|
| 10,070,097 B2 | 9/2018 | Yamamoto et al. | |
| 2009/0153734 A1 * | 6/2009 | Glen ................ | H04N 21/43615 |
| | | | 348/E5.085 |

(Continued)

FOREIGN PATENT DOCUMENTS

| | | | | |
|---|---|---|---|---|
| CN | 111918013 A | * | 11/2020 | .......... H04N 7/0125 |
| KR | 100772416 B1 | | 11/2007 | |

(Continued)

*Primary Examiner* — Aaron W Carter
*Assistant Examiner* — Joshua B. Crockett
(74) *Attorney, Agent, or Firm* — Bryan Cave Leighton Paisner LLP

(57) ABSTRACT

The present disclosure provides a method for transmitting video data by a source device, by using a high definition media interface (HDMI). In particular, the method comprises the steps of: receiving, from a sink device, capability information about whether reference display model (RDM)-based image processing of the sink device is supported; performing the RDM-based image processing on a plurality of pieces of video data, on the basis of the received capability information; and transmitting, to the sink device, (i) the plurality of pieces of video data on which the RDM-based image processing is performed and (ii) image processing information about a result of the RDM-based image processing, wherein the RDM-based image processing is (i) performed on the basis of a value of a feature of one piece (Continued)

of video data among the plurality of pieces of video data or (ii) performed on the basis of one feature value among feature values related to a separately set feature aside from values of features of the plurality of pieces of video data.

8 Claims, 13 Drawing Sheets

(51) Int. Cl.

| | | |
|---|---|---|
| *G06T 7/90* | (2017.01) | |
| *G06V 10/60* | (2022.01) | |
| *G09G 5/12* | (2006.01) | |
| *H04N 21/436* | (2011.01) | |
| *H04N 21/4402* | (2011.01) | |

(52) U.S. Cl.
CPC .............. *G06V 10/60* (2022.01); *G09G 5/12* (2013.01); *H04N 21/436* (2013.01); *H04N 21/4402* (2013.01); *G06T 2207/20208* (2013.01)

(56) References Cited

U.S. PATENT DOCUMENTS

| | | | | |
|---|---|---|---|---|
| 2017/0094344 | A1* | 3/2017 | Kozuka | H04N 21/4408 |
| 2017/0310905 | A1 | 10/2017 | Gopinath et al. | |
| 2018/0041784 | A1* | 2/2018 | Ho | H04N 21/43635 |
| 2018/0262819 | A1* | 9/2018 | Tsukagoshi | H04N 21/2365 |
| 2019/0208089 | A1* | 7/2019 | Nishio | H04N 21/485 |
| 2019/0356881 | A1 | 11/2019 | Huang et al. | |
| 2020/0051525 | A1* | 2/2020 | Mikami | H04N 13/327 |
| 2020/0053334 | A1* | 2/2020 | Oh | H04N 21/4402 |
| 2020/0410957 | A1* | 12/2020 | Takatori | G09G 5/005 |

FOREIGN PATENT DOCUMENTS

| | | | | |
|---|---|---|---|---|
| KR | 20110091852 A | 8/2011 | | |
| KR | 20160132900 A | 11/2016 | | |
| KR | 20190129579 A | 11/2019 | | |
| WO | WO-2018070822 A1 * | 4/2018 | ....... | H04N 21/43635 |

* cited by examiner

[FIG. 1]
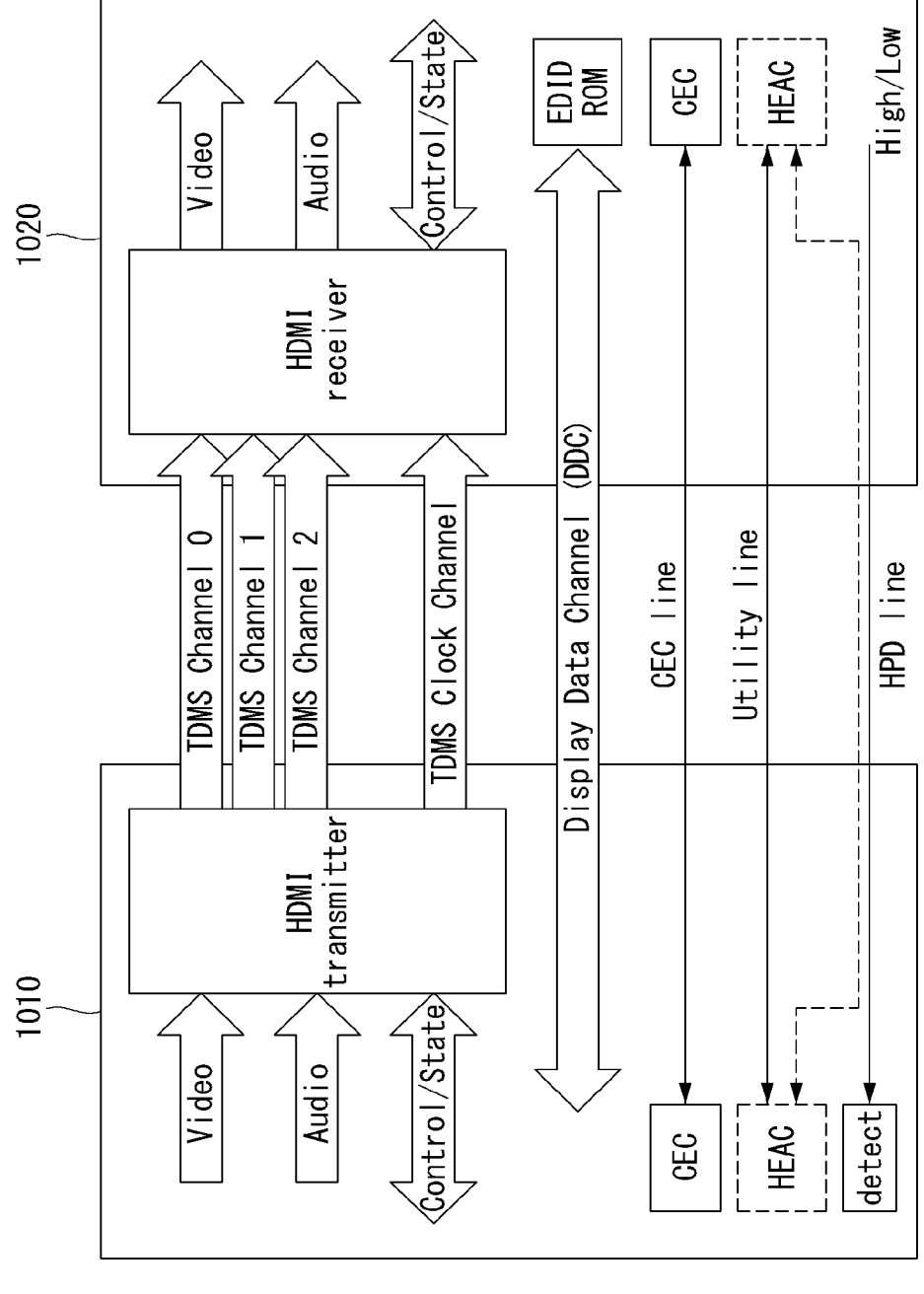

【FIG. 2】
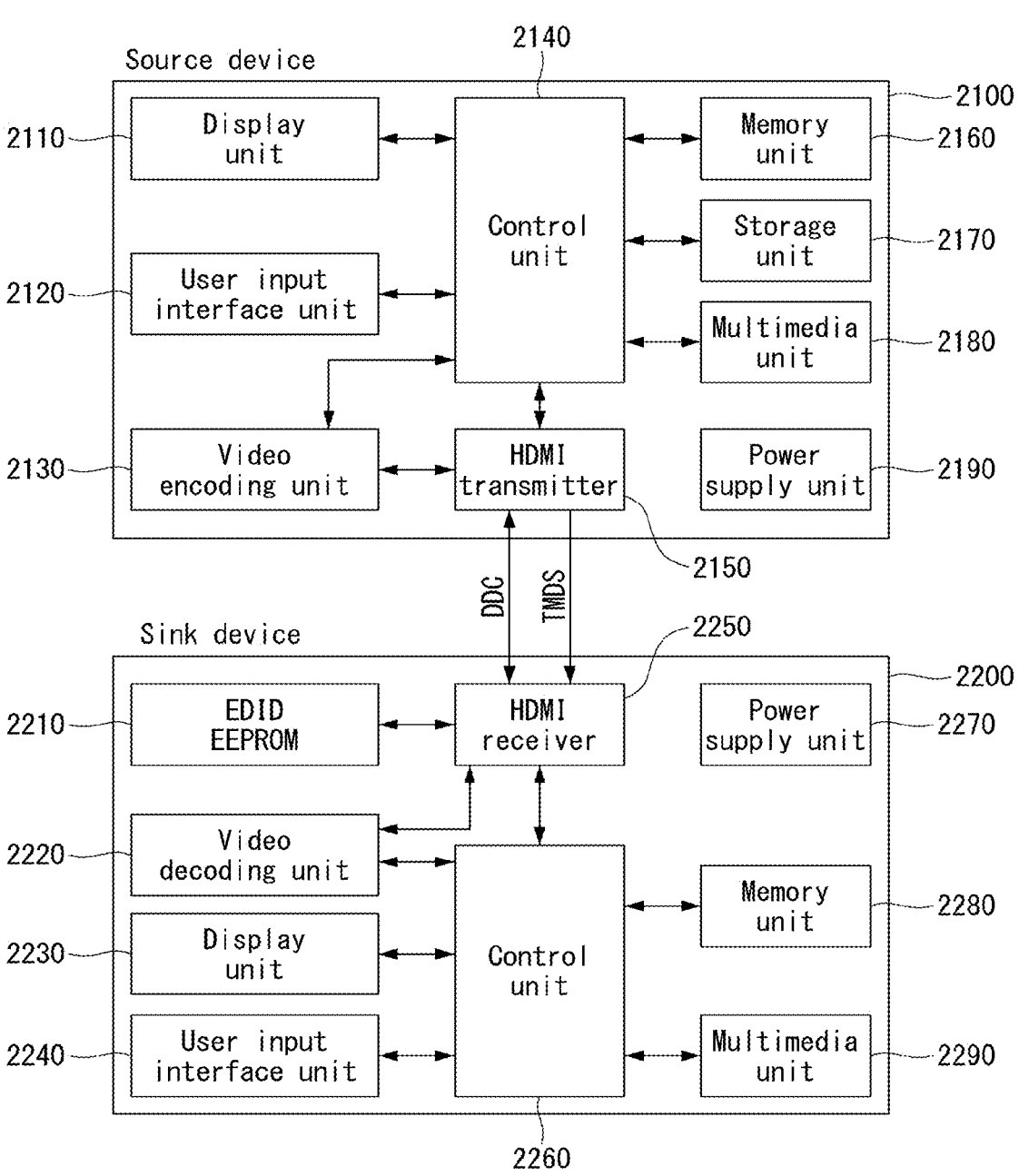

【FIG. 3】

| Address | No. Bytes | Description |
|---|---|---|
| 00h ~ 07h | 8 | Header information.<br>Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital),Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings.<br>Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

【FIG. 4】

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

【FIG. 5】

(a) Video Data Block

| Byte # | Bits 5-7 | Bits 0-4 |
|--------|----------|----------|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|--------|----------|----------|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|--------|----------|----------|
| 0 | Speaker allocation Tag Code | The total number of bytes for Speaker Allocation (L3 = 3) |
| 1~3 | Speaker Allocation Data Block Payload | |

【FIG. 6】

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_ Present | RR_ Capable | Rsvd(0) | Rsvd(0) | LTE_340Mcs c_scramble | Indpendent _view | Dual_ View | 3D_OSD_ Disparity |
| 7 | Rsvd(0) | Rsvd(0) | Rsvd(0) | Rsvd(0) | Rsvd(0) | DC_48bit _420 | DC_36bit _420 | DC_30bit _420 |
| ...N | Reserved (0) | | | | | | | |

FIG. 7

(a) HF_VSIF packet header

| Byte/Bits # | 7 | 6 | 5 | 4 | 3 | 2 | 1 | 0 |
|---|---|---|---|---|---|---|---|---|
| 0 | Packet Type = 0x81 | | | | | | | |
| 1 | Version = 0x01 | | | | | | | |
| 2 | Length = Nv | | | | | | | |

(b) HF_VSIF packet contents

| Packet Byte # | 7 | 6 | 5 | 4 | 3 | 2 | 1 | 0 |
|---|---|---|---|---|---|---|---|---|
| PB0 | Checksum | | | | | | | |
| PB1 | IEEE OUI, Third Octet (0xD8) | | | | | | | |
| PB2 | IEEE OUI, Second Octet (0x5D) | | | | | | | |
| PB3 | IEEE OUI, First Octet (0xC4) | | | | | | | |
| PB4 | Version(=1) | | | | | | | |
| PB5 | Rsvd(0) | Rsvd(0) | Rsvd(0) | Rsvd(0) | Rsvd(0) | Rsvd(0) | Rsvd(0) | 3D_Valid |
| (PB6)* | 3D_F_Structure | | | | 3D_Additional_Info_Present | 3D_Disparity_Data_Present | 3D_Meta_present | Rsvd(0) |
| (PB7)* | 3D_F_Ext_Data | | | | Rsvd(0) | | | |
| (PB8)* | Rsvd(0) | Rsvd(0) | Rsvd(0) | 3D_Dual_view | 3D_ViewDependency | Rsvd(0) | Rsvd(0) | 3D_Preferred2DView |
| (PB9)* | 3D_DisparityData_Version | | | | | | | |
| | 3D_Disparity_Data_length(J) | | | | | | | |
| (PB9+1)* | 3D_DisparityData_1 | | | | | | | |
| ⋮ | ⋮ | | | | | | | |
| (PB9+J)* | 3D_DisparityData_J | | | | | | | |
| (PBm)* | 3D_MetaData_type | | | | | | | |
| | 3D_MetaData_length(K) | | | | | | | |
| (PBm+1)* | 3D_Metadata_1 | | | | | | | |
| ⋮ | ⋮ | | | | | | | |
| PBm+K)* | 3D_Metadata_K | | | | | | | |
| ...PB(Nv) | Rsvd(0) | Rsvd(0) | Rsvd(0) | Rsvd(0) | Rsvd(0) | Rsvd(0) | Rsvd(0) | Rsvd(0) |

【FIG. 8】

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

【FIG. 9】
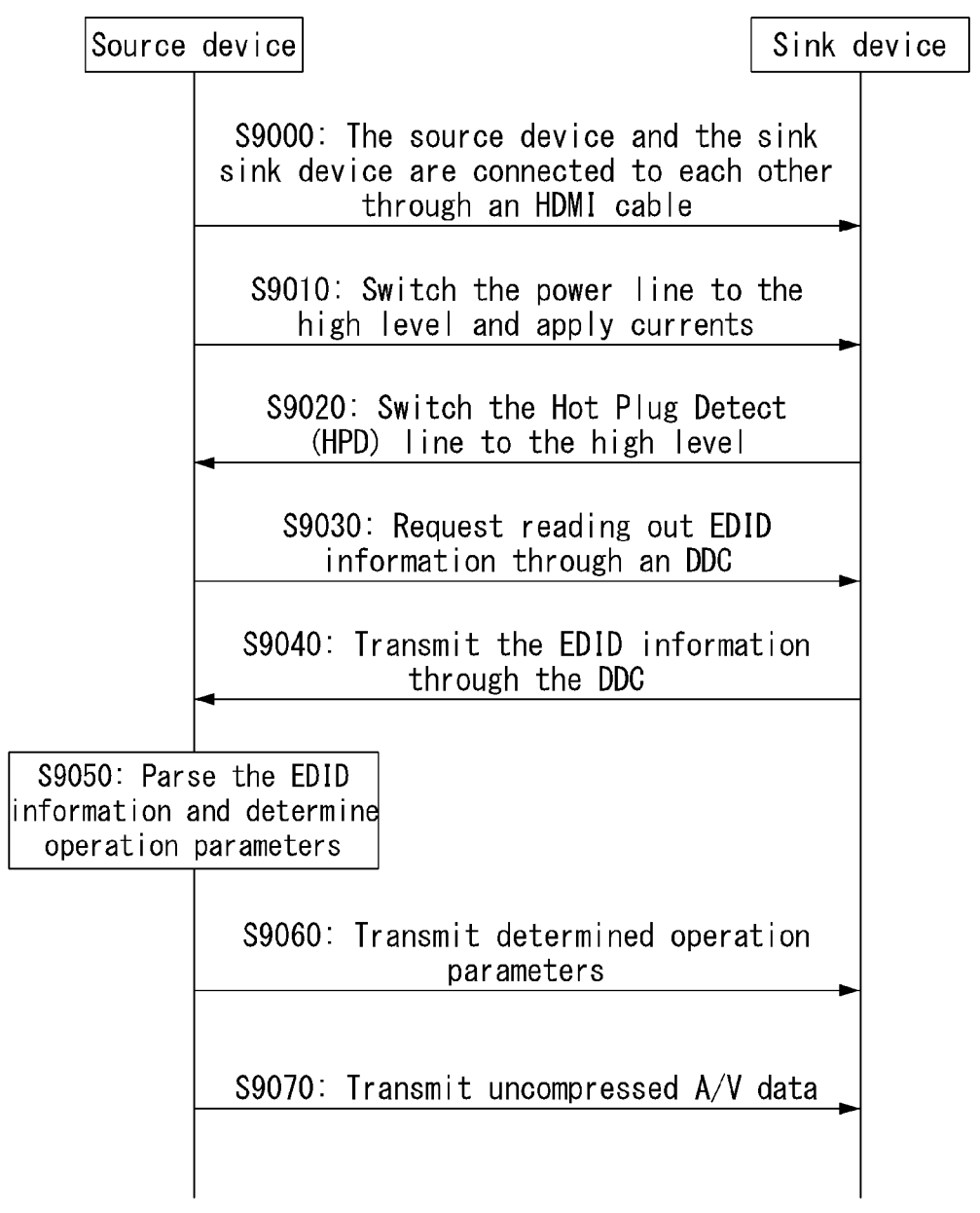

【FIG. 10】
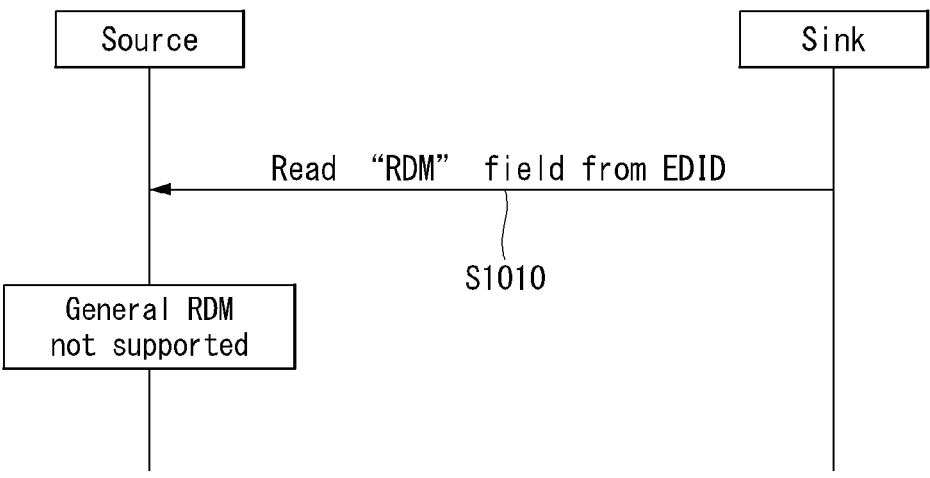
【FIG. 11】
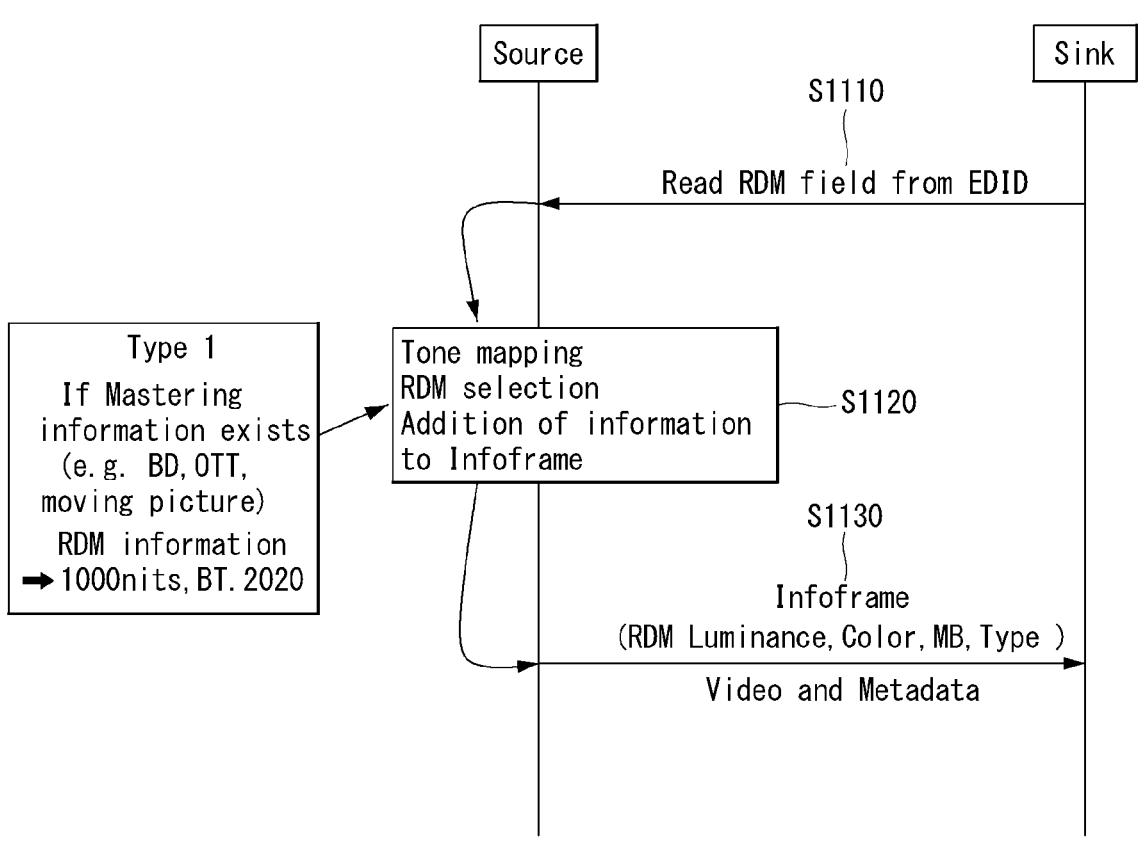

【FIG. 12】
| Byte / Bit # | 7 | 6 | 5 | 4 | 3 | 2 | 1 | 0 |
|---|---|---|---|---|---|---|---|---|
| | 1210 ———RDM MB | | | | 1220 ———RDM Luminance | | | |
| Byte / Bit # | 7 | 6 | 5 | 4 | 3 | 2 | 1 | 0 |
| | 1230 ———RDM Type | | | | 1240 ———RDM Color | | | |
【FIG. 13】
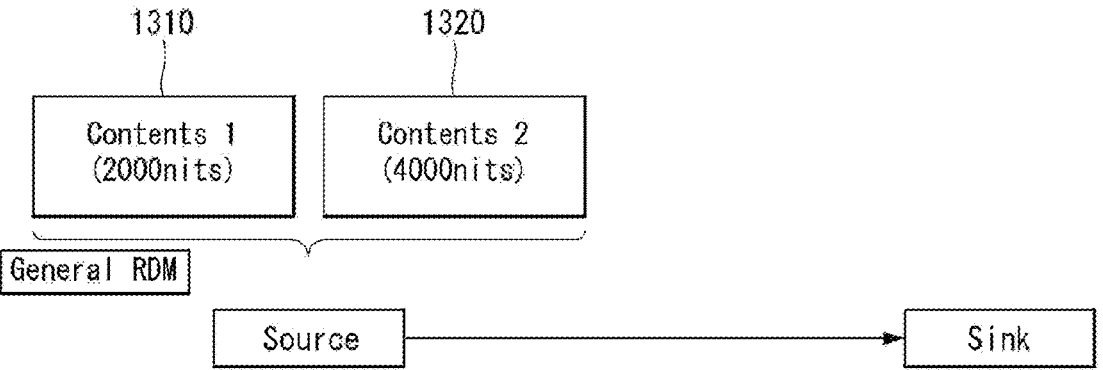
【FIG. 14】
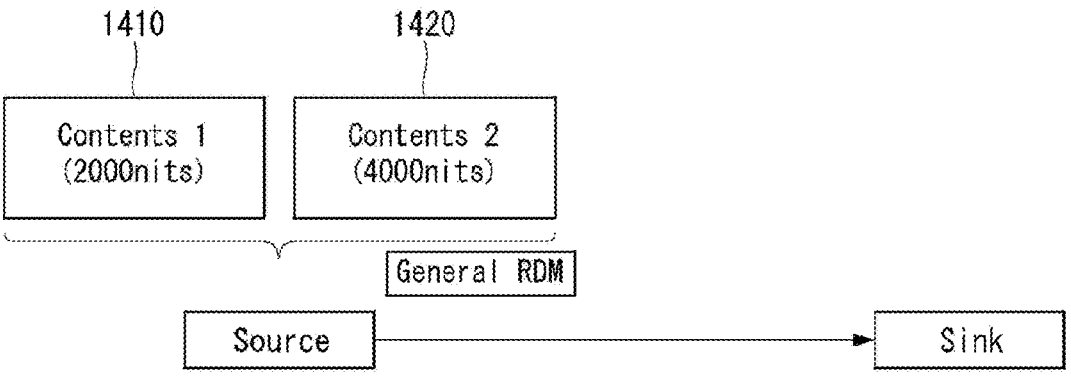

【FIG. 15】
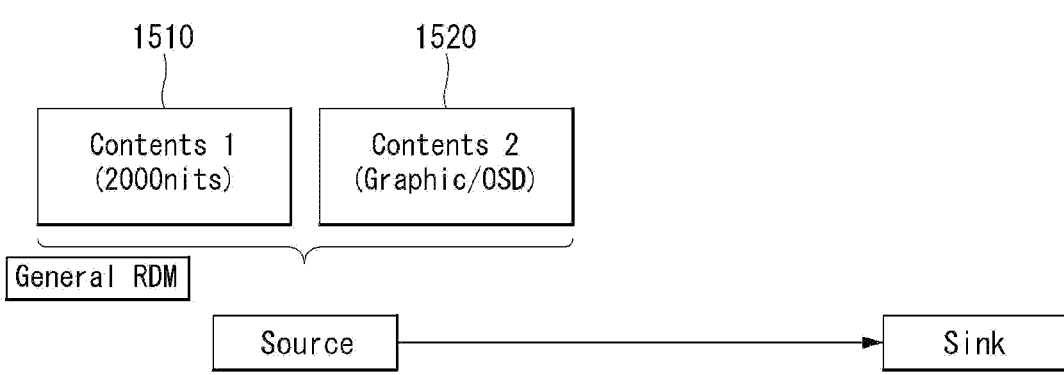
【FIG. 16】
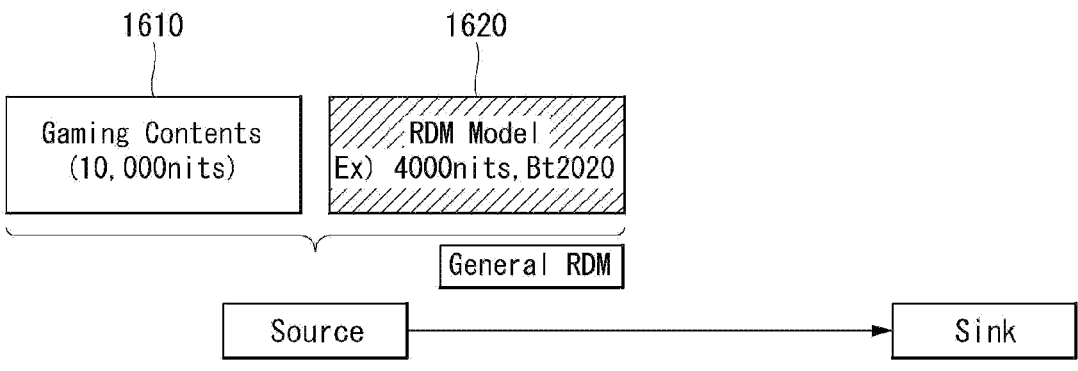

【FIG. 17】
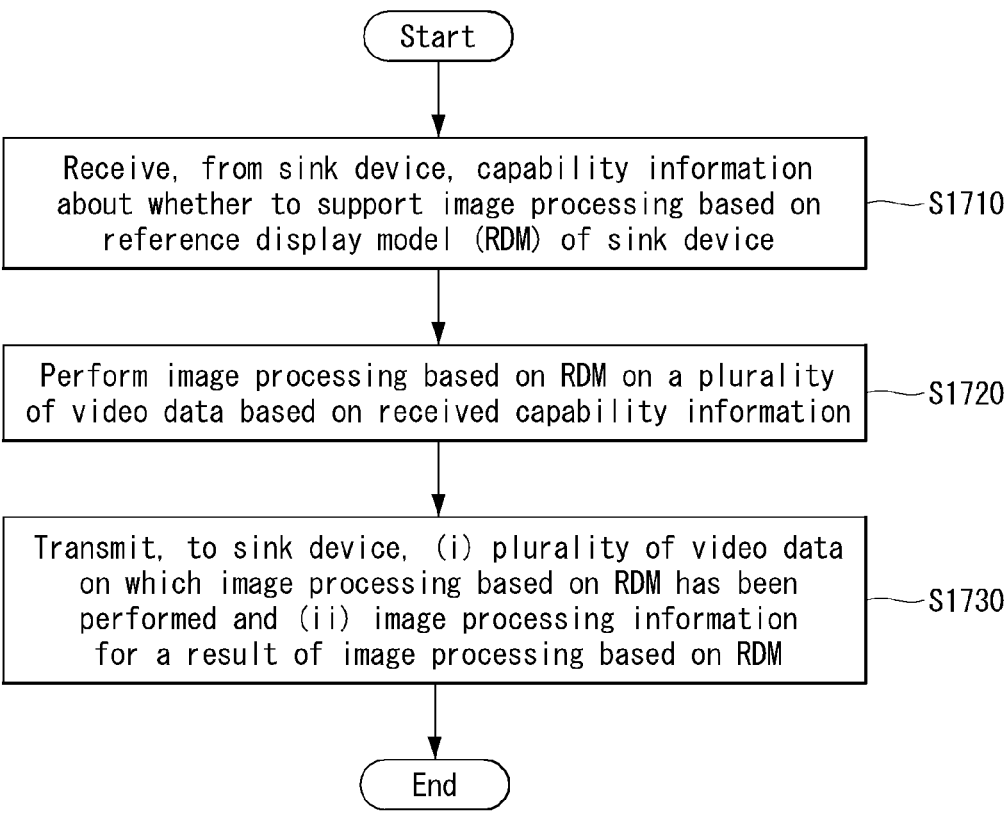

VIDEO DATA TRANSMISSION AND RECEPTION METHOD USING HIGH-SPEED INTERFACE, AND APPARATUS THEREFOR

CROSS-REFERENCE TO RELATED APPLICATION

This application is the National Stage filing under 35 U.S.C. 371 of International Application No. PCT/KR2021/006085, filed May 14, 2021, which claims priority to and the benefit of U.S. Provisional Application No. 63/038,082, filed Jun. 11, 2020, and Korea Application No. 10-2020-0057974, filed on May 14, 2020, the disclosure of which is incorporated herein by reference in its entirety.

TECHNICAL FIELD

The present disclosure relates to a method of transmitting and receiving video data using a high definition multimedia interface (HDMI) and a device therefor, and more particularly to a method of transmitting and receiving video data performed via an HDMI when not receiving information for image processing and a device therefor.

BACKGROUND ART

An HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software.

DISCLOSURE

Technical Problem

An object of the present disclosure is to provide a method of transmitting and receiving video data via a high-speed interface and a device therefor.

Another object of the present disclosure is to provide a method of performing image processing for video data in a source device and a device therefor.

Another object of the present disclosure is to provide a method of performing image processing of a source device when the source device fails to receive information used for image processing for video data from a sink device.

Another object of the present disclosure is to provide a method of performing image processing for video data with different characteristics of a source device when the source device fails to receive information used for image processing for video data from a sink device.

Another object of the present disclosure is to provide a method of performing image processing for video data including HDR video data and SDR video data with different characteristics of a source device when the source device fails to receive information used for image processing for video data from a sink device.

Another object of the present disclosure is to provide a method of performing image processing for video data for gaming contents of a source device when the source device fails to receive information used for image processing for video data from a sink device.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In the present disclosure, a method of transmitting, by a source device, video data based on a high definition multimedia interface (HDMI), the method comprising: receiving, from a sink device, capability information about whether to support an image processing based on a reference display model (RDM) of the sink device; performing the image processing based on the RDM on a plurality of video data based on the received capability information; and transmitting, to the sink device, (i) the plurality of video data on which the image processing based on the RDM has been performed and (ii) image processing information for a result of the image processing based on the RDM, wherein the image processing based on the RDM is performed based on (i) a value of characteristic of one video data among the plurality of video data, or (ii) one specific value among separately configured specific values related to characteristics of the plurality of video data other than values of the characteristics of the plurality of video data.

Furthermore, in the present disclosure, wherein based on the source device not supporting the image processing based on the RDM, the image processing based on the RDM is not performed.

Furthermore, in the present disclosure, wherein based on the sink device supporting the image processing based on the RDM, the image processing based on the RDM is performed.

Furthermore, in the present disclosure, wherein the image processing information includes information on RDM mean brightness (MB), information on RDM luminance, information on RDM color, and information on RDM type.

Furthermore, in the present disclosure, wherein based on the values of the characteristics of the plurality of video data having different values, performing the image processing based on the RDM further comprises: selecting the one video data that is a standard for determining a scheme of the image processing based on the RDM among the plurality of video data; and performing a tone mapping on the plurality of video data based on the value of the characteristic of the one video data.

Furthermore, in the present disclosure, wherein the plurality of video data is high dynamic range (HDR) video data.

Furthermore, in the present disclosure, wherein the different values of the characteristics of the plurality of video data are values for an HDR luminance range that is a luminance range upon an output of the HDR video data.

Furthermore, in the present disclosure, wherein the one video data is video data having a smallest value of the HDR luminance range among the plurality of video data, and wherein the tone mapping is performed based on a value of the HDR luminance range of the one video data.

Furthermore, in the present disclosure, wherein the one video data is video data having a largest value of the HDR luminance range among the plurality of video data, and wherein the tone mapping is performed based on a value of the HDR luminance range of the one video data.

Furthermore, in the present disclosure, wherein the plurality of video data includes at least one high dynamic range (HDR) video data and at least one standard dynamic range (SDR) video data.

Furthermore, in the present disclosure, wherein the one video data is selected from among the at least one HDR video data among the at least one HDR video data and the at least one SDR video data, and wherein the tone mapping is performed based on a value of an HDR luminance range that is a luminance range upon an output of the one video data that is the HDR video data.

Furthermore, in the present disclosure, wherein information for the value of the characteristic of the one video data configures information included in the image processing information.

Furthermore, in the present disclosure, wherein based on the values of the characteristics of the plurality of video data having the same value, performing the image processing based on the RDM further comprises: selecting the one specific value from among the specific values; and performing a tone mapping on the plurality of video data based on the specific value.

Furthermore, in the present disclosure, further comprising: generating information included in the image processing information based on the specific value.

Furthermore, in the present disclosure, wherein the plurality of video data is video data for gaming contents.

Furthermore, in the present disclosure, wherein the image processing based on the RDM is performed based on the source device not receiving, from the sink device, display information used for the image processing for the plurality of video data.

Furthermore, in the present disclosure, a source device transmitting video data based on a high definition multimedia interface (HDMI), the source device comprising: a HDMI transmitter; and a control unit, wherein the control unit is configured to control the HDMI transmitter to: receive, from a sink device, capability information about whether to support an image processing based on a reference display model (RDM) of the sink device; perform the image processing based on the RDM on a plurality of video data based on the received capability information; and transmit, to the sink device, (i) the plurality of video data on which the image processing based on the RDM has been performed and (ii) image processing information for a result of the image processing based on the RDM, wherein the image processing based on the RDM is performed based on (i) a value of characteristic of one video data among the plurality of video data, or (ii) separately configured specific values related to characteristics of the plurality of video data other than values of the characteristics of the plurality of video data.

Technical Effects

The present disclosure has an effect of transmitting and receiving video data via a high-speed interface.

The present disclosure also has an effect of performing image processing for video data in a source device.

The present disclosure also has an effect where a source device can perform image processing for video data even if the source device fails to receive information used for image processing for video data from a sink device.

The present disclosure also has an effect where a source device can perform image processing for video data with different characteristics even if the source device fails to receive information used for image processing for video data from a sink device.

The present disclosure also has an effect where a source device can perform image processing for video data including HDR video data and SDR video data with different characteristics even if the source device fails to receive information used for image processing for video data from a sink device.

The present disclosure also has an effect where a source device can perform image processing for video data for gaming contents even if the source device fails to receive information used for image processing for video data from a sink device.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

FIG. 1 illustrates an HDMI system and data transmission and reception channels included in the HDMI system according to an embodiment of the present disclosure.

FIG. 2 illustrates a source device and a sink device in a HDMI system according to an embodiment of the present disclosure.

FIG. 3 illustrates an EDID structure according to an embodiment of the present disclosure.

FIGS. 4 and 5 illustrate an embodiment of an EDID extension block.

FIG. 6 illustrates an HF (HDMI Forum)-VSDB (Vendor-Specific Data Block) according to an embodiment of the present disclosure.

FIG. 7 illustrates an HF (HDMI Forum)-VSDB (Vendor-Specific InfoFrame) according to an embodiment of the present disclosure.

FIG. 8 illustrates an SCDC (Status and Control Data Channel) structure according to an embodiment of the present disclosure.

FIG. 9 illustrates a method of transmitting and receiving A/V data through HDMI according to an embodiment of the present disclosure.

FIGS. 10 and 11 are flow charts illustrating an example where an image processing method described in the present disclosure is performed between a source device and a sink device.

FIG. 12 illustrates an example of detailed information configuration related to image processing based on RDM in a source device.

FIG. 13 illustrates an example of performing an image processing method described in the present disclosure when video data transmitted by a source device includes video data for a plurality of HDR videos with different characteristics.

FIG. 14 illustrates another example of performing an image processing method described in the present disclosure when video data transmitted by a source device includes video data for a plurality of HDR videos with different characteristics.

FIG. 15 illustrates an example of performing an image processing method described in the present disclosure when video data transmitted by a source device includes video data for at least one HDR video and video data for at least one SDR video.

FIG. 16 illustrates an example of performing an image processing method described in the present disclosure when video data transmitted by a source device includes only video data for gaming contents.

FIG. 17 is a flow chart illustrating an example where an image processing method for video data described in the present disclosure is performed by a source device.

MODE FOR INVENTION

Hereinafter, configuration and operation of an embodiment of the present disclosure will be described with reference to the accompanying drawings. The configuration and operation of the present disclosure described by the drawings are described as one embodiment, and the technical idea of the present disclosure and its core configuration and operation are not limited thereby.

The terms used in the present disclosure have been selected as general terms currently widely used as much as possible, but in specific cases, the present disclosure will be described using terms arbitrarily selected by the applicant. In such a case, since the meaning is clearly described in the detailed description of the corresponding part, it should not be simply interpreted only by the name of the term used in the description of the present disclosure, and it should be understood and interpreted as well as the meaning of the corresponding term.

In addition, the terms used in the present disclosure are general terms selected to describe the invention, but if there are other terms with similar meanings, they can be substituted for more appropriate interpretation. For example, signals, data, information, etc. can be appropriately substituted and interpreted in each signal processing process.

FIG. 1 illustrates an HDMI system and data transmission and reception channels included in the HDMI system according to one embodiment of the present disclosure.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in 10-bit words which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present disclosure.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit 2170 to the sink device 2200. The source device 2100 can send a request message to the sink device 2200; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of control units 2140, 2260 respectively.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device 2100, a sink device 2200, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data, including a command between devices, as well as request, action, or response messages and audio/video data.

The video decoding unit 2220 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

**DDC Version 1 (Approved in 1994)

EDID (Extended Display Identification Data) is defined, which is a binary file format specifying monitoring information.

Pin 12 is used as a data line, and an EDID block of 128 byte is transmitted consecutively from a monitor to a computer.

**DDC Version 2 (Approved in 1996)

EDID is no longer defined by the DDC, but specified separately as a companion standard.

DDC version 2 is based on I2C serial bus. Pin 12 is now used as the data line, and pin 15 is used as the clock line of I2C bus.

Pin 9 is used to supply 5V DC power (up to 50 mA) from the computer to the monitor to read the EDID stored in the EEPROM even if the monitor is powered off.

DDC version 2 uses an 8 bit data offset and supports the EDID storage capacity ranging from 28 bytes to 256 bytes.

**E-DDC

E-DDC replaces the DDC version 1 and 2, and version 1 was introduced in 1999. To use E-EDID (Enhanced EDID), the E-DDC allows up to 32 Kbytes of display information storage capacity.

By employing a new I2C addressing scheme based on 8-bit segment index (0x00~0x7F), 128 segments (1 segment=256 bytes) can be accessed, by which up to 32 bytes can be accessed.

E-DDC version 1.1 was approved in 2004, which supports a video interface such as HDMI in addition to CE devices and VGA.

E-DDC version 1.2 was approved in 2007, which supports display port and display ID In what follows, EDID provided through the DDC will be described.

FIG. 3 illustrates an EDID structure according to an embodiment of the present disclosure.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video descriptor represents the video identification code defined in the CEA-861. In the audio data block of FIG. 5(*b*), the short audio descriptor represents the audio format code defined in the CEA-861. In the speaker allocation data block of FIG. 5(*c*), the speaker allocation data block descriptor represents the data block payload defined in the CEA-861.

FIG. 6 illustrates an HF (HDMI Forum)-VSDB (Vendor-Specific Data Block) according to an embodiment of the present disclosure.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340 Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

The present disclosure is capable of signaling decompression capability information of the sink device through an HF-VSDB of the EDID, which will be described later.

FIG. 7 illustrates an HF (HDMI Forum)-VSIF (Vendor-Specific InfoFrame) according to an embodiment of the present disclosure.

In FIG. 7, FIG. 7(a) shows the HF-VSIF packet header, FIG. 7(b) shows HF-VSIF packet contents, and they can form the infoframe together. The HF-VSIF is one of the infoframe.

The HF-VSIF packet is provided to support the feature(s) that requests ancillary information for fully identifying stream contents and can be transmitted from the source device to the sink device. As an example, the HF-VSIF may be defined for transmission of 3D video and 2160p video.

In what follows, described are the HF-VSIF packet header of FIG. 7(a) and fields included in the HF-VSIF packet contents of FIG. 7(b).

**HF-VSIF packet header
Packet Type field: indicates payload type and is identified as 0x81 in the HF-VSIF.

Version field: indicates the version number of the HF-VSIF and has a value of 1.

Length field: indicates the length of the payload.

**HF-VSIF Packet Contents
3D_Valid field: indicates that transmission of 3D video data is in progress. If this field is set to 1, the 3D_F_Structure, 3D_Addiotional_Info_Present, 3D_Meta_Present, and 3D_F_Ext_Data field should be activated.

3D_F_Structure field: indicates the transmission format of 3D video data (side-by-side, top-and-bottom, and so on).

3D_Additional_Infor_Present field: this field is set to 1 when 3D_DualView, 3D_ViewDependency, and 3D_Preferred2DView information are added.

3D_Disparity_Data_Present field: this filed is set to 1 when 3D disparity data are present.

3D_Meta_Present field: this field is set to 1 when 3D metadata are present.

3D_F_Ext_Data field: indicates a sub-sampling method according to the transmission format of 3D video data.

3D_Dual_View field: this field is set to 1 when 3D dual views are available.

3D_ViewDependency field: describes dependency of the right view or left view with respect to a coded view.

3D_Preferred2DView field: indicates which of the right 3D view and the left 3D view is more appropriate for 2D view.

3D_DisparityData_Version field: indicates the version of 3D disparity data.

3D_DisparityData_length field: indicates the length of 3D disparity data.

3D_DisparityData_1-3D_DisparityData_J field: describe the 3D disparity data.

3D_MetaData_type field: indicates the type of 3D metadata.

3D_MetaData_length field: indicates the length of 3D metadata.

3D_Metadata_1-3D_Metadata_K field: describe 3D metadata.

FIG. 8 illustrates an SCDC (Status and Control Data Channel) structure according to an embodiment of the present disclosure.

The SCDC (Status and Control Data Channel) corresponds to a point-to-point communication protocol based on which the source device and the sink device exchange data with each other. The SCDC communication can use the aforementioned DDC channel (I2C line). In other words, the SCDC is a one-to-one communication protocol based on the I2C serial communication that enables HDMI source devices and sink devices to exchange data among them. The SCDC includes a mechanism in which the sink device, an I2C slave, requests status check read from the source device, an I2C master, and the source device receiving the request reads the corresponding status from the sink device.

The SCDCS (SCDC Structure) can be stored in the memory of the sink device and include data having the structure as shown in FIG. 8. In FIG. 8, R/W indicates whether the source device can only read or read/write the SCDCS data stored in the sink device.

The fields included in the SCDCS of FIG. 8 are described below.

Sink Version field: provides version information of an SCDCS compliant sink device.

Source Version field: when the SCDCS compliant sink device reads E-EDID from the sink device, and the SCDC_Present of the E-EDID is set to 1, the source version of the SCDCS is set to 1.

Update Flags (Update_0, Update_1) field: when there is a change in the information that the sink device has to inform of the source device (Status, Character Error Detect, and so on), the corresponding bit is set to 1.

TMDS Configuration (TMDS_Config) field: each of the TMDS_Bit_Clock_Ratio and Scrambling_Enable occupies one bit, and if the source device attempts to activate the scrambling function of the sink device, the corresponding bit is set to 1. If the TMDS_Bit_Clock_Ratio is 1/10, this field is set to 0 while it is set to 1 in the case of 1/40.

Scrambler Status field: when the sink device detects a scrambled control code sequence, the corresponding bit is set to 1.

Configuration (Config_0) field: this field is used to configure capability-related information of the source and the sink device. Currently, this field provides only the RR_Enable field that indicates whether the source device supports a read request of the sink device.

Status Flags (Status_Flag_0, Status_Flag_1) field: indicates whether data received through the clock, channel 0, 1, and 2 have been decoded successfully.

Err_Det_0~2_L/H field: represent the LSB and MSB of the error counter detected in the channel 0 to 3.

Err_Det_Checksum field: is implemented so that one byte sum of error detection values of seven registers including checksum becomes 0.

FIG. 9 illustrates a method of transmitting and receiving A/V data through HDMI according to an embodiment of the present disclosure.

FIG. 9 illustrates an embodiment in which HDMI devices transmit uncompressed A/V data (at least one of audio data or video data) from a source device to a sink device.

First, the source device and the sink device are connected to each other through an HDMI cable S9000. If the HDMI cable is connected, the source device changes the 5V power line from the low level to the high level and applies currents S9010. By doing so, the source device can operate the EEPROM and related circuit in which the EDID information of the sink device is stored. By changing the HPD (Hot Plug Detect) line from the low level to the high level S9020, the sink device can inform the source device that the cable has been connected normally, the EDID-related circuit has been activated, and thus the EDID information can be accessed.

Now, the source device can transmit the EDID information read request to the sink device through the DDC S9030. In response to the EDID read request of the source device, the sink device can transmit the EDID information stored in the EEPROM through the DDC S9040. In the embodiment of the present disclosure, the EDID information can be transmitted as the aforementioned HF-VSDB.

The sink device can determine operation parameters (timing, format, and so on) for the A/V data to be transmitted to the sink device by parsing the received EDID information S9050 and transmit to the source device determined operation parameters related to the uncompressed A/V data to be transmitted S9060. In the embodiment of the present disclosure, the operation parameters may be transmitted as the HF-VSIF.

Finally, the source device can transmit uncompressed A/V data controlled by the determined operation parameters to the sink device S9070.

The present disclosure relates to an image processing method for video data. More specifically, the present disclosure relates to an image processing method for video data in a sink device and an image processing method for video data in a source device. In this instance, the sink device may be devices such as a TV, and the source device may be a BDP, a gaming console, etc. The image processing method described in the present disclosure can be applied to various types of video data, such as processed high dynamic range (HDR) video data, standard dynamic range (SDR) video data, etc. Hereinafter, image processing for video data may be interpreted as including image processing for various types of video data including HDR video data.

The image processing in the source device or the sink device may be performed based on information used for image processing. The information used for image processing may be referred to as display information, and may be expressed in various ways within the same/similarly interpreted range. The display information may include luminance information, color gamut information, color volume information, black level information, inverse tone information, gamut mapping information, OLED/LCD Type information, and the like. More specifically, since the display information is generated by the sink device during the image processing in the sink device, the sink device performs image processing based on the display information generated by the sink device. On the other hand, during the image processing in the source device, the source device receives the display information from the sink device and performs image processing based on the received display information.

An image processing method described in the present disclosure can be preferably applied to image processing in the source device. In particular, the image processing method described in the present disclosure can be applied when the source device does not receive the display information from the sink device.

When the source device does not receive display information used for image processing for video data from the sink device, the source device performs image processing on video data based on information used to replace the display information. Hereinafter the information used to replace the display information may be referred to as general information, general display information, reference information, reference display information, RDM information, or the like, and the information may be expressed in various ways within the same/similarly interpreted range. In this instance, the fact that the image processing for video data is performed based on the general information means that information of a wider range than a range of display information that the source device can receive from the sink device is predefined, and the image processing is performed based on the predefined information of wide range. That is, the general information may be interpreted to mean the predefined information of wide range. More specifically, when a value of peak luminance and a value of color gamut indicated by the display information that the source device actually receives from the sink device is 400 nits and BT.709, respectively, a peak luminance value and a color gamut value indicated by the general information defined in the source device may be defined as 1,000 nits and BT.2020 that are wider than the values indicated by the display information.

A model consisting of (storing) the general information may be stored/defined/configured in the source device. The model may be referred to as general reference display model (RDM), RDM, G-RDM, etc., and may be expressed in various ways within the same/similarly interpreted range. In addition, for the wide image processing for video data based on the RDM, various types classified based on a combination of the general information may be defined in the RDM.

When the source device transmits the video data on which the image processing has been performed, the source device also transmits, to the sink device, whether the image processing has been performed based on the RDM and detailed information related to the image processing. In this instance, whether the image processing has been performed based on the RDM and the detailed information related to the image processing may be collectively referred to as information on a result of image processing, image processing information, and the like, and may be expressed in various ways within the same/similarly interpreted range. In this instance, whether the image processing has been performed based on the RDM and the information on the result of image processing may be transmitted via Infoframe or data packet.

The image processing information may be defined to include the following information.

Content type: the corresponding information may represent a game, a movie, a mixed video, and the like.

Detailed information related to image processing: luminance information, color information, RDM mean brightness (MB) information, and RDM type information. The RDM type information may represent types classified based on a combination of general information. For example, the corresponding information may represent Type1, Type2, Type3, etc., and image processing may be performed in a different way for each type of corresponding information.

Whether the RDM is processed: the corresponding information is denoted by 1 or 0. '1' may denote that the image processing based on RDM has been performed, and '0' may denote that the image processing based on RDM has not been performed, or vice versa.

Meta data for additional image processing in the sink device after the image processing in the source device. The meta data may include information such as Max-CLL, MaxFall, etc.

FIGS. 10 and 11 are flow charts illustrating an example where an image processing method described in the present disclosure is performed between a source device and a sink device.

First, FIG. 10 illustrates an example where the sink device does not support the image processing based on RDM. The fact that the sink device does not support the image processing based on RDM may mean that the sink device receives, from the source device, video data on which the image processing based on RDM has been performed in the source device, and the sink device fails to perform an operation for the image processing on the received video data.

Although not illustrated in FIG. 10, the source device may transmit, to the sink device, a read request message for requesting to read whether the sink device supports the image processing based on RDM.

Subsequently, the source device may read an RDM field from EDID of the sink device, in S1010. More specifically, the source device may receive, from the sink device, a read response message about whether the sink device supports the image processing based on RDM. The read response message may include capability information indicating whether the sink device supports the image processing based on RDM. The capability information (RDM field) may represent that the sink device does not support the image processing based on RDM.

Next, the source device may determine whether to perform the image processing based on RDM based on the capability information. In the example of FIG. 10, since the capability information represents that the sink device does not support the image processing based on RDM, the source device may not perform the image processing based on RDM. In this case, the source device may request display information from the sink device for the purpose of the image processing on video data.

Next, FIG. 11 illustrates an example where the sink device supports the image processing based on RDM. The fact that the sink device supports the image processing based on RDM may mean that the sink device receives, from the source device, video data on which the image processing based on RDM has been performed in the source device, and the sink device can perform an operation for the image processing on the received video data.

Although not illustrated in FIG. 11, the source device may transmit, to the sink device, a read request message for requesting to read whether the sink device supports the image processing based on RDM.

Subsequently, the source device may read an RDM field from EDID of the sink device, in S1110. More specifically, the source device may receive, from the sink device, a read response message about whether the sink device supports the image processing based on RDM. The read response message may include capability information representing whether the sink device supports the image processing based on RDM. The capability information (RDM field) may represent that the sink device can support the image processing based on RDM.

Next, the source device may determine whether to perform the image processing based on RDM based on the capability information. In the example of FIG. 11, since the capability information represents that the sink device can support the image processing based on RDM, the source device performs the image processing based on RDM, in S1120.

The image processing may be a tone mapping operation between video data. The source device may select an RDM type to be applied during image processing on video data to be transmitted by the source device based on a type classified based on general information (RDM information). Subsequently, the source device may add image processing information on a result of the image processing to an information frame depending on the result of the image processing performed based on the selected RDM type.

Next, the source device may transmit, to the sink device, video data on which the image processing based on RDM has been performed and the image processing information, in S1130. In this instance, the image processing information may include luminance information, color information, RDM mean brightness (MB) information, and RDM type information applied to the video data, and meta data for additional image processing in the sink device after the image processing in the source device. In addition, although not illustrated in FIG. 11, the image processing information may further include information about whether the image processing based on RDM has been performed.

FIG. 12 illustrates an example of detailed information configuration related to image processing based on RDM in a source device.

In FIG. 12, detailed information related to image processing based on RDM may include four pieces of information 1210 to 1240, and values that can be represented by each piece of information may be defined as in Table 1 below.

TABLE 1

| Information filed | Description |
| --- | --- |
| RDM Luminance[3:0] | 0: 1000 nits |
| | 1: 2000 nits |
| | 2: 4000 nits |
| | 3: reserved |
| RDM MB(Mean Brightness) [3:0] | 0: 0 |
| | 1: 0.1 |
| | 2: reserved |
| | 3: reserved |
| RDM Color[3:0] | 0: BT.2020 |
| | 1: reserved |
| | 2: reserved |
| | 3: reserved |
| RDM Type[3:0] | 0: Type 1(movie + movie) |
| | 1: Type 2(movie + Graphic) |
| | 2: Type 3(gaming, PC) |
| | 3: reserved |

The above Table 1 is only an example for convenience of explanation. Information fields included in the detailed information are limited to an example of the above Table 1, and it is obvious that values that the information fields can represent can be variously configured.

Hereinafter, embodiments of the RDM application to video data will be described in more detail when image processing based on RDM is performed.

Video data that the source device can transmit can be implemented in various types. There are (1) an example where the video data includes a plurality of HDR videos (embodiment 1), (2) an example where the video data includes at least one HDR video and at least one SDR video (embodiment 2), and (3) an example where the video data includes only video data related to gaming contents (embodiment 3).

With respect to the three examples, the source device may perform image processing based on RDM. In particular, in the three examples, the respective video data may have different characteristics. In this case, when the image processing is not performed on the video data with different characteristics, the video data cannot be normally output on one screen. The characteristics of video data on which image processing is performed may be a dynamic range (or luminance range), and the image processing performed on the video data with different characteristics may mean tone mapping. This may mean a luminance range when the dynamic range (or luminance range) video data is output.

Hereinafter, an image processing method based on the RDM is described for each of the three examples.

(Embodiment 1) Example where Video Data
Includes a Plurality of HDR Videos

This embodiment can be applied when video data transmitted by a source device includes video data for a plurality of HDR videos, and the video data has different characteristics (dynamic ranges). That is, when characteristic values of the video data are different, this embodiment can be applied. In this case, image processing based on RDM for the video data may be performed based on characteristic of one video data among the video data. That is, a characteristic value of the one video data may be treated as general information that is a standard of the image processing based on RDM.

More specifically, when the number of video data transmitted by the source device is two, and dynamic ranges of the two video data are different from each other, image processing may be performed on the two video data based on a dynamic range of one video data among the two video data. That is, a dynamic range value of the one video data may be treated as general information that is a standard of the image processing based on RDM. In this instance, video data having a larger dynamic range value among the two video data may be determined as video data for the image processing based on RDM. On the contrary, video data having a smaller dynamic range value among the two video data may be determined as video data for the image processing based on RDM. When video data having a smaller dynamic range value among two video data is determined as video data for image processing based on RDM, image processing applied to the video data having the smaller dynamic range value is performed on video data having a greater dynamic range value, thereby causing a loss. Such a type of image processing is defined as inversion tone mapping.

After the image processing based on RDM is performed according to the above-described method, the source device may transmit image processing information on a result of image processing to the sink device. In this instance, the image processing information may be configured based on a characteristic value of one video data that is a standard of the image processing based on RDM among video data. More specifically, values of luminance information, color information, and RDM mean brightness (MB) information included in the image processing information may represent the same value as a value of one video data that is a standard of the image processing based on RDM.

In addition, when the number of video data transmitted by the source device is three or more, video data having a largest value of characteristic among all the video data may be determined as video data that is a standard of the image processing based on RDM. Further, when the number of video data transmitted by the source device is three or more, video data having a smallest value of characteristic among all the video data may be determined as video data that is a standard of the image processing based on RDM. In addition, when the number of video data transmitted by the source device is three or more, video data having a value of characteristic closest to an average value of values of characteristics of all the video data among all the video data may be determined as video data that is a standard of the image processing based on RDM. The source device does not perform the image processing based on RDM based on a value of characteristic of one video data among video data, and separate specific values related to the characteristics other than values of characteristics of the video data may be defined in the source device, and the source device may select one specific value from among the separate specific values and perform the image processing based on RDM based on the selected specific value.

FIG. 13 illustrates an example of performing an image processing method described in the present disclosure when video data transmitted by a source device includes video data for a plurality of HDR videos with different characteristics.

More specifically, FIG. 13 illustrates an example where two video data transmitted by the source device has different characteristics, and the sink device supports image processing based on RDM.

In FIG. 13, a video data 1310 having a dynamic range value of 2000 nits and a video data 1320 having a dynamic range value of 4000 nits are illustrated.

First, the source device may receive, from the sink device, capability information about whether to support image processing based on a reference display model (RDM) of the sink device. Next, the source device may perform the image processing based on RDM on two video data based on the received capability information. In this instance, the source device may select the video data 1310 having the dynamic range value of 2000 nits from among the video data 1310 having the dynamic range value of 2000 nits and the video data 1320 having the dynamic range value of 4000 nits, as video data that is a standard of the image processing based on RDM. Afterward, the source device may perform image processing based on the dynamic range value of 2000 nits on both the video data 1310 having the dynamic range value of 2000 nits and the video data 1320 having the dynamic range value of 4000 nits.

Next, the source device may transmit to the sink device (i) the video data 1310 and 1320 on which the image processing based on RDM has been performed and (ii) image processing information for a result of the image processing based on RDM.

Information included in the image processing information may be configured based on characteristic values of the video data 1310 having the dynamic range value of 2000 nits.

Although not illustrated in FIG. 13, the source device may perform the image processing based on RDM based on one specific value among separately configured specific values related to the characteristics other than the values of the characteristics of the video data.

FIG. 14 illustrates another example of performing an image processing method described in the present disclosure when video data transmitted by a source device includes video data for a plurality of HDR videos with different characteristics.

More specifically, FIG. 14 illustrates an example where two video data transmitted by the source device has different characteristics, and the sink device supports image processing based on RDM.

In FIG. 14, a video data 1410 having a dynamic range value of 2000 nits and a video data 1420 having a dynamic range value of 4000 nits are illustrated.

First, the source device may receive, from the sink device, capability information about whether to support image processing based on a RDM of the sink device. Next, the source device may perform the image processing based on RDM on two video data based on the received capability information. In this instance, the source device may select the video data 1420 having the dynamic range value of 4000 nits among the video data 1410 having the dynamic range value of 2000 nits and the video data 1420 having the dynamic range value of 4000 nits, as video data that is a standard of the image processing based on RDM. Afterward, the source device may perform image processing based on the dynamic range value of 4000 nits on both the video data 1410 having the dynamic range value of 2000 nits and the video data 1420 having the dynamic range value of 4000 nits.

Next, the source device may transmit to the sink device (i) the video data 1410 and 1420 on which the image processing based on RDM has been performed and (ii) image processing information for a result of the image processing based on RDM.

Information included in the image processing information may be configured based on characteristic values of the video data 1420 having the dynamic range value of 4000 nits.

Although not illustrated in FIG. 14, the source device may perform the image processing based on RDM based on one specific value among separately configured specific values related to the characteristics other than the values of the characteristics of the video data.

(Embodiment 2) Example where Video Data Includes at Least One HDR Video and at Least One SDR Video This embodiment can be applied when video data transmitted by a source device includes video data for at least one HDR video and video data for at least one SDR video. In this instance, the video data for the at least one HDR video may have different characteristics (dynamic ranges). In this case, image processing based on RDM for the video data may be performed based on characteristic of one video data selected from among the video data for the at least one HDR video. That is, a characteristic value of the one video data selected from among the video data for the at least one HDR video may be treated as general information that is a standard of the image processing based on RDM.

More specifically, the number of video data transmitted by the source device may be two, and the two video data may include video data for one HDR video and video data for one SDR video. In this instance, based on a characteristic value (dynamic range) of the video data for the one HDR video, the image processing may be performed on the two video data. That is, the characteristic value (dynamic range) of the video data for the one HDR video may be treated as general information that is a standard of the image processing based on RDM.

In summary, when the video data includes video data for at least one HDR video and video data for at least one SDR video, the selection for video data that is a standard of the image processing based on RDM may be performed only within the video data for the at least one HDR video.

In addition, when the number of video data for at least one HDR video and video data for at least one SDR video constituting the video data transmitted by the source device is two or more, respectively, the selection for video data that is a standard of the image processing based on RDM is performed only within the video data for the at least one HDR video. In this instance, the embodiment 1 described above can be equally applied to select one video data from among the video data for the at least one HDR video.

After the image processing based on RDM is performed according to the above-described method, the source device may transmit image processing information on a result of image processing to the sink device. In this instance, the image processing information may be configured based on a characteristic value of one video data that is a standard of the image processing based on RDM among video data. More specifically, values of luminance information, color information, and RDM mean brightness (MB) information included in the image processing information may represent the same value as a value of one video data that is a standard of the image processing based on RDM.

FIG. 15 illustrates an example of performing an image processing method described in the present disclosure when video data transmitted by a source device includes video data for at least one HDR video and video data for at least one SDR video.

More specifically, FIG. 15 illustrates an example where two video data transmitted by the source device includes video data for one HDR video and video data for one SDR video, and the sink device supports image processing based on RDM.

In FIG. 15, a video data 1510 having a dynamic range value of 2000 nits and a video data [Graphic/OSD] 1520 having a standard dynamic range value are illustrated.

First, the source device may receive, from the sink device, capability information about whether to support image processing based on a RDM of the sink device. Next, the source device may perform the image processing based on RDM on two video data based on the received capability information. In this instance, the source device may select the video data 1510 having the dynamic range value of 2000 nits from among the video data 1510 having the dynamic range value of 2000 nits and the video data [Graphic/OSD] 1520 having the standard dynamic range value, as video data that is a standard of the image processing based on RDM. Afterward, the source device may perform image processing based on the dynamic range value of 2000 nits on both the video data

1510 having the dynamic range value of 2000 nits and the video data [Graphic/OSD] 1520 having the standard dynamic range value.

Next, the source device may transmit to the sink device (i) the video data 1510 and 1520 on which the image processing based on RDM has been performed and (ii) image processing information for a result of the image processing based on RDM.

Information included in the image processing information may be configured based on characteristic values of the video data 1510 having the dynamic range value of 2000 nits.

Although not illustrated in FIG. 15, the source device may perform the image processing based on RDM based on one specific value among separately configured specific values related to the characteristics other than the values of the characteristics of the video data.

(Embodiment 3) Example where Video Data Includes Only Video Data for Gaming Contents This embodiment can be applied when video data transmitted by a source device includes only video data for gaming contents. In this instance, the video data for gaming contents may have the same characteristic (dynamic range) value. Due to characteristics of the video data for gaming contents, a dynamic range value of the video data for gaming contents has a greater value than the video data for HDR video and the video data for SDR video described above.

When video data transmitted by the source device includes only video data for gaming contents, image processing based on RDM for the video data may be performed based on one specific value of separately configured specific values related to the characteristics other than characteristic (dynamic range) values of the video data. That is, the source device may select one value from among values stored in the RDM including the above-described general information and perform image processing on the video data for gaming contents based on the selected value. The selected value may have a value of 300 nit, 1000 nit, etc. In the embodiments 1 and 2 described above, the characteristic value of one video data selected from among the video data has been treated as general information that is a standard of the image processing based on RDM. On the other hand, in the embodiment 3, one piece of information is selected from among predefined general information.

After the image processing based on RDM is performed according to the above-described method, the source device may transmit image processing information on a result of image processing to the sink device. In this instance, the image processing information may be generated based on one specific value selected from among specific values that the source device pre-configures via the RDM. Information included in the image processing information may include information corresponding to the selected specific value. More specifically, values of luminance information, color information, and RDM mean brightness (MB) information included in the image processing information may represent the same value(s) as the specific value selected for the image processing based on RDM.

FIG. 16 illustrates an example of performing an image processing method described in the present disclosure when video data transmitted by a source device includes only video data for gaming contents.

More specifically, FIG. 16 illustrates an example where the source device transmits the video data for gaming contents and the sink device supports the image processing based on RDM.

In FIG. 16, a video data 1610 for gaming contents having a dynamic range value of 10,000 nits and an RDM model 1620 including values for dynamic range preconfigured to the source device are illustrated.

First, the source device may receive, from the sink device, capability information about whether to support image processing based on a RDM of the sink device. Next, the source device may perform the image processing based on RDM on video data for gaming contents based on the received capability information. In this instance, the source device may select one specific value from the RDM model 1620 including values for dynamic range preconfigured to the source device. FIG. 16 illustrates an example where specific values respectively related to characteristics of video data are selected to have values of 4000 nit and BT2020. Subsequently, the source device may perform the image processing on the video data 1610 for gaming contents having the dynamic range value of 10000 nits based on the values of 4000 nit and BT2020.

Next, the source device may transmit to the sink device (i) the video data 1610 on which the image processing based on RDM has been performed and (ii) image processing information for a result of the image processing based on RDM.

Information included in the image processing information may be configured based on the selected characteristic values having the values of 4000 nit and BT2020.

FIG. 17 is a flow chart illustrating an example where an image processing method for video data described in the present disclosure is performed by a source device.

More specifically, the source device receives, from a sink device, capability information about whether to support image processing based on a reference display model (RDM) of the sink device in order to transmit video data using a high definition multimedia interface (HDMI), in S1710.

Next, the source device performs the image processing based on RDM on a plurality of video data based on the received capability information, in S1720.

Next, the source device transmits, to the sink device, (i) the plurality of video data on which the image processing based on RDM has been performed and (ii) image processing information for a result of the image processing based on RDM, in S1730.

In this instance, the image processing based on RDM is performed based on (i) a value of characteristic of one video data among the plurality of video data, or (ii) one specific value among separately configured specific values related to characteristics of the plurality of video data other than values of the characteristics of the plurality of video data.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The aforementioned preferred embodiments of the present disclosure have been disclosed for illustrative purposes, and those skilled in the art can improve, modify, substitute, or add various other embodiments without departing from the technical spirit and scope of the present disclosure disclosed in the attached claims.

The invention claimed is:

1. A method of transmitting, by a source device, video data based on a high definition multimedia interface (HDMI), the method comprising:
receiving, from a sink device, capability information indicating whether the sink device supports image processing based on a predefined reference display model (RDM);
performing image processing on a plurality of video data using the predefined RDM stored in the source device, based on the capability information and in absence of receiving display information from the sink device;
transmitting, to the sink device:
(i) the plurality of video data processed based on the predefined RDM, and
(ii) image processing information including at least one of RDM mean brightness, RDM luminance, RDM color, or RDM type, representing a result of the image processing based on the predefined RDM, wherein the image processing based on the predefined RDM comprises performing tone mapping on the plurality of video data based on a luminance characteristic value of one video data selected from among the plurality of video data having different HDR luminance ranges, wherein the one video data is video data having a smallest value of the HDR luminance range among the plurality of video data.

2. The method of claim 1, wherein based on the sink device supporting the image processing based on the predefined RDM, the image processing based on the predefined RDM is performed.

3. The method of claim 1,
wherein the predefined RDM stored in the source device includes display characteristics comprising at least one of peak brightness or color space configuration.

4. The method of claim 1, wherein the plurality of video data includes at least one high dynamic range (HDR) video data and at least one standard dynamic range (SDR) video data.

5. The method of claim 4, wherein the one video data selected from among the plurality of video data for performing the tone mapping is HDR video data.

6. The method of claim 1, wherein the plurality of video data is video data for gaming contents.

7. The method of claim 1, wherein the image processing is performed entirely by the source device without feedback from the sink device.

8. A source device transmitting video data based on a high definition multimedia interface (HDMI), the source device comprising:
the HDMI; and
a processor,
wherein the processor is configured to control the HDMI to:
receive, from a sink device, capability information indicating whether the sink device supports image processing based on a predefined reference display model (RDM);
perform image processing on a plurality of video data using the predefined RDM stored in the source device, based on the capability information and in absence of receiving display information from the sink device;
transmit, to the sink device:
(i) the plurality of video data processed based on the predefined RDM, and
(ii) image processing information including at least one of RDM mean brightness, RDM luminance, RDM color, or RDM type, representing a result of the image processing based on the predefined RDM,
wherein the image processing based on the predefined RDM comprises performing tone mapping on the plurality of video data based on a luminance characteristic value of one video data selected from among the plurality of video data having different HDR luminance ranges, wherein the one video data is video data having a smallest value of the HDR luminance range among the plurality of video data.

* * * * *